United States Patent [19]

Watanabe

[11] 4,307,798
[45] Dec. 29, 1981

[54] SAFETY DEVICE FOR PRESS

[76] Inventor: Kunio Watanabe, No. 53-321, Sohara-mochida, Kagamigahara Shi, Gifu Ken, Japan

[21] Appl. No.: 98,200

[22] Filed: Nov. 27, 1979

[30] Foreign Application Priority Data

Dec. 12, 1978 [JP] Japan ............................ 53-171598[U]

[51] Int. Cl.³ .............................................. F16P 3/08
[52] U.S. Cl. ..................................... 192/133; 74/613; 100/53
[58] Field of Search ................. 74/612, 613, 615, 616; 192/133, 134; 100/53

[56] References Cited

U.S. PATENT DOCUMENTS

| 2,236,730 | 4/1941 | MacBlane | 192/134 |
| 2,683,515 | 7/1954 | Horn et al. | 192/134 |
| 3,377,884 | 4/1968 | Guy et al. | 74/615 |
| 3,877,859 | 4/1975 | Grazine | 74/616 X |
| 3,913,413 | 10/1975 | Walker | 74/612 |
| 3,996,815 | 12/1976 | Walker | 74/612 |
| 4,039,021 | 8/1977 | Moritz et al. | 74/612 X |
| 4,129,048 | 12/1978 | Shocklee et al. | 74/612 |
| 4,137,795 | 2/1979 | Lindquist | 74/613 |
| 4,179,987 | 12/1979 | Dohm, Jr. | 74/616 X |
| 4,220,032 | 9/1980 | Smith, Jr. | 74/615 X |

FOREIGN PATENT DOCUMENTS

| 1203851 | 1/1960 | France | 192/134 |
| 746376 | 3/1956 | United Kingdom | 192/134 |

Primary Examiner—C. J. Husar
Assistant Examiner—Moshe I. Cohen
Attorney, Agent, or Firm—Wenderoth, Lind & Ponack

[57] ABSTRACT

The invention is related to a safety device for a press machine or the like. The safety device includes a first guard plate which slidably extends over the machine access area and is powered by an air cylinder having a movable rod connected to a movable arm of the first guard plate. The device also has a second guard plate slidably attached to the first guard plate which has a switch means for deactivating the air cylinder and therefore stopping the forward motion of the first guard plate whenever the second guard plate exhibits movement toward said first guard plate. For example, when a user's hand is in the access area and the second guard plate strikes the hand thereby slidably moving the second guard plate toward the first, the safety device is deactivated and the guard plates move away from the machine access area.

9 Claims, 7 Drawing Figures

SAFETY DEVICE FOR PRESS

BACKGROUND AND SUMMARY OF THE INVENTION

This invention relates to a safety device, which is mounted in front of a head of a press for safeguarding the operator from danger during the time of press operation. It comprises a frame supporting a vertically movable transparent guard plate which is mounted upright in front of the head of the press, and the press is controlled such that it is operated while the guard plate is in its lower set position and is not operated when the guard plate is raised.

Some Objects of the Invention are as follows.

An object of the invention is to safeguard the operator of the press.

Another object of the invention is to safeguard the operator from the vertically movable guard plate, which is intended to safeguard the operator.

DETAILED DESCRIPTION OF THE INVENTION

Figure 1:
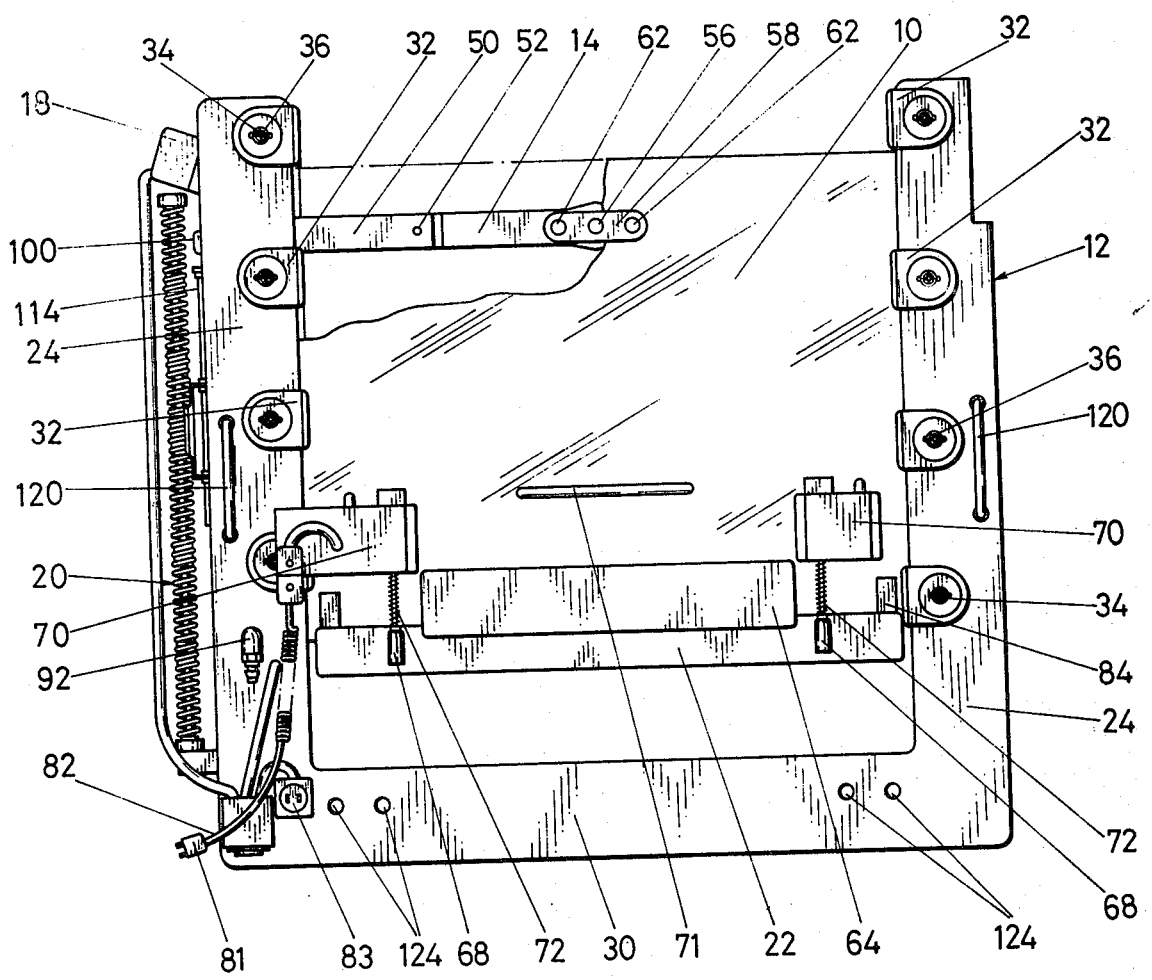
FIG. 1 is a front elevational view of the safety device of an embodiment according to the invention.
Figure 2:
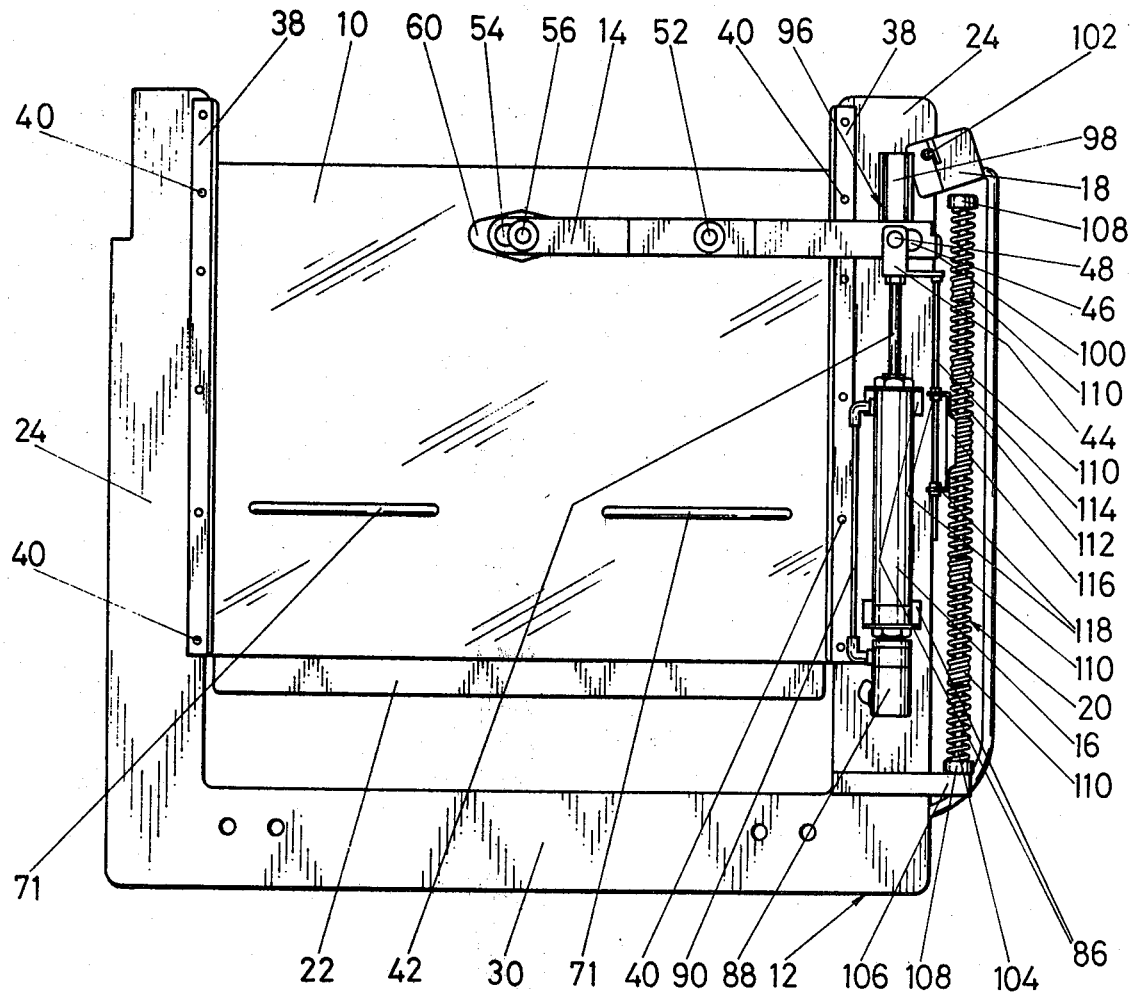
FIG. 2 is rear view of the safety device shown in FIG. 1.

The main construction of the safety device according to the present invention is shown in FIGS. 1 and 2 in an embodiment thereof.

The main components of the safety device for a press according to the invention are a vertically movable guard plate 10 made of a transparent plastic material, a frame 12 supporting the guard plate 10, a movable arm 14 for vertically moving the guard plate 10, a cylinder 16 for operating the arm 14, a switch unit 18 for starting and stopping the press in accordance with the vertical descent and ascent of the guard plate 10, a balancer mechanism 20 for averaging the load at the time of the ascent and descent of the guard plate 10 and an auxiliary guard plate 22 which is vertically moved together with the guard plate 10.

Referring to FIG. 1, the guard plate 10 consists of a substantially rectangular transparent plastic plate. The fact that the guard plate 10 is transparent has an advantage that the workpiece or state of press operation can be confirmed at the time of the operation of the press through the guard plate.

Figure 7:
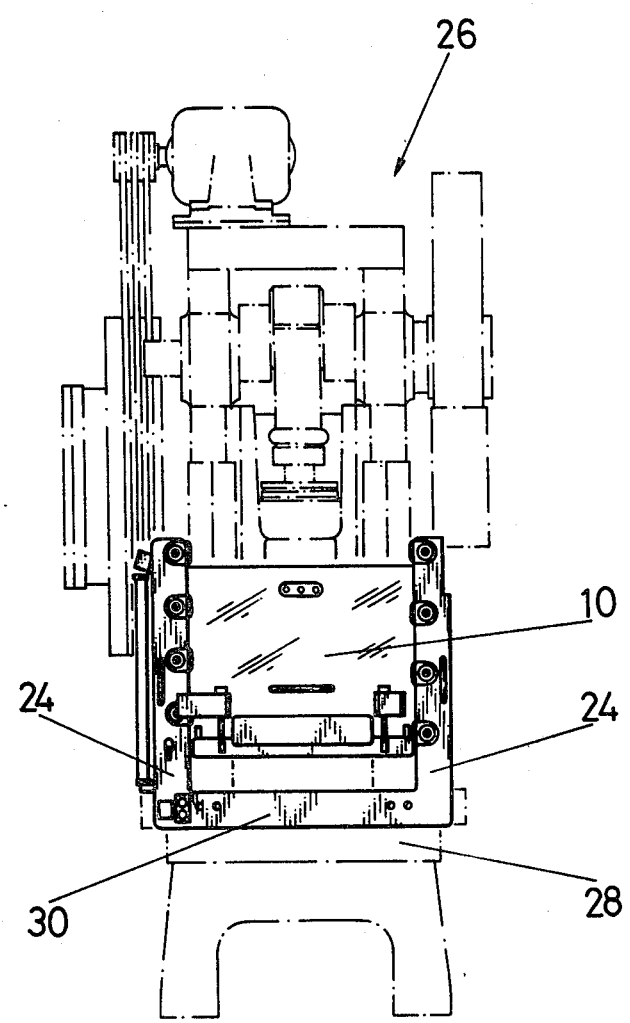
FIG. 7 is a front view of the device shown in FIG. 1 in the operating state.

The frame 12 which supports the guard plate 10 is made from a metal plate and has a substantially channel-shaped structure corresponding to the outer shape of the guard plate 10 except for the top thereof. More particularly, it has opposite side upright portions 24 and a horizontal lower portion 30 which is mounted on a head 28 of the press 26 (as shown in FIG. 7). The opposite side upright portions 24 of the frame 12 are each provided on the front side thereof with four uniformly spaced support pieces 32 which are secured by bolts 34 and nuts 36 to each upright portion and which inwardly project to a slight extent for supporting the guard plate 10 in such a manner as to permit ascent and descent of the plate 10.

The back side of each upright portion 24 is provided with an elongate guide member 38 which is secured by screws 40 to the upright portion 24 and which inwardly projects to a slight extent for supporting the opposite side ends of the back side of the guard plate 10.

As the guide plate 10 is vertically moved, each of its side ends is guided by a channel-shaped guide formed by the inner side of each upright portion 24, the back side of the front side support pieces 32 and the back side of the back side guide member 38.

For controlling the vertical movement of the guard plate 10, an upper portion of the guard plate 10 is provided on the back side thereof with a movable arm 14 which extends in a direction which is at a substantially right angle to the direction of length of the upright portions 24. As shown in FIG. 2, the right hand end of the movable arm 14 is coupled to a coupling member 44, which is secured to the upper end of a rod 42 of a cylinder 16 which is mounted on the back side of the upright portion 24, by a pin 48 which is received in an elongated slot 46. Due to the loose fitted pin 48 arm 14 has substantial play.

Figure 5:
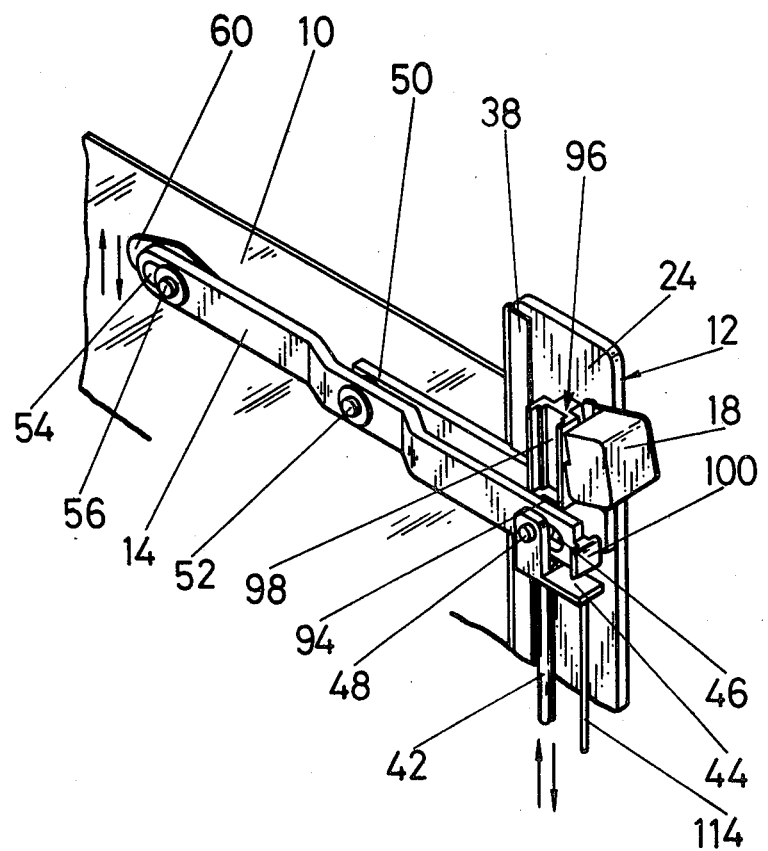
FIG. 5 is a partial perspective view showing a portion of the device including a movable arm of the safety device shown in FIG. 1.

Referring to FIGS. 1 and 5, a stationary arm 50 extending on the inner side of the movable arm 14 and having substantially one half the length of the movable arm 14 is secured at its right hand end (shown in FIG. 5) to the corresponding upright portion 24. The movable arm 14 and stationary arm 50 are coupled together by a bolt 52 inserted in a bolt hole formed in the stationary arm 50 near the free end thereof and a bolt hole formed in a central portion of the movable arm 14, and the movable arm 14 is vertically pivotable about the bolt 52 which is a fulcrum.

For transmitting the vertical motion of the movable arm 14 pivotable about the bolt 52 to the guide plate 10, the movable arm is formed near its free end with a slot 54 and play, a bolt 56 is inserted into the slot 54 which allows for substantial play. With one end of the bolt 56 penetrating the guard plate 10 and projecting to the front side, the guard plate 10 and movable arm 14 are coupled together via stationary plate 58.

Further, on the inner side of the free end of the movable arm 14 which is adjacent to the back side of plate 10, a stationary plate 60 is provided which is in contact with the movable arm 14, and these stationary plates 58 and 60 are secured to the opposite sides of the guard plate 10 by at least one bolt 62.

With the vertical movement of the rod 42 of the cylinder 16, the movable arm 14 is pivotally moved about the bolt 52 provided at the free end of the stationary arm 50, whereby the end of the movable arm 14 is vertically moved to a substantial extent thereby causing vertical movement of the guard plate 10, which is coupled to the free end of the movable arm, along the inner side of the upright portions 24 of the frame 12, support pieces 32 and guide members 40. The vertically movable guard plate 10 is mounted on the head 28 of the press 26. The press is electrically controlled such that it is operated only when the guard plate is in the lower set position and is not operated when the guard plate 10 is raised. According to the invention, a means for preventing secondary danger is provided.

If for example a hand is inserted between the horizontal portion 30 of the frame 12 and lower end of guard plate 10 during the descent thereof, the hand is likely to be injured.

In order to prevent this type of secondary accident from occurring, the guard plate 10 is provided at the lower end with an auxiliary guard plate 22 which is capable of slight vertical movement with respect to the guard plate 10. The length dimension of the auxiliary guard plate 22 is such that it is slightly shorter than the corresponding dimension of the guard plate 10, and elongated vertical movement control member 64, which is shorter than the length of the auxiliary guard plate 22 and has a U-shaped cross sectional profile which is open on the side of the horizontal portion 30 of the frame 12, is secured to the front side of the lower end of the guard plate 10.

The upper end of the auxiliary guard plate 22 is inserted into a guide groove 66 which is formed in the vertical movement control plate 64, and plate 22 can be raised and lowered through the guide groove 66. The purpose of this auxiliary guard plate 22 is to prevent injury not only by the press 26 itself but also due to the descent of the guard plate 10.

When a hand etc. is inserted by mistake between the auxiliary guard plate 22 and horizontal portion 30 of the frame 12 and hits the plate 22, the vertical movement control plate 22 is raised, through the groove 66 of the vertical movement control plate 64 by the action of the guard plate 10 being lowered, to actuate a switch 78 so as to raise the guard plate 10 together with the auxiliary guard plate 22 for stopping the press 26 through electric control.

Figure 4:
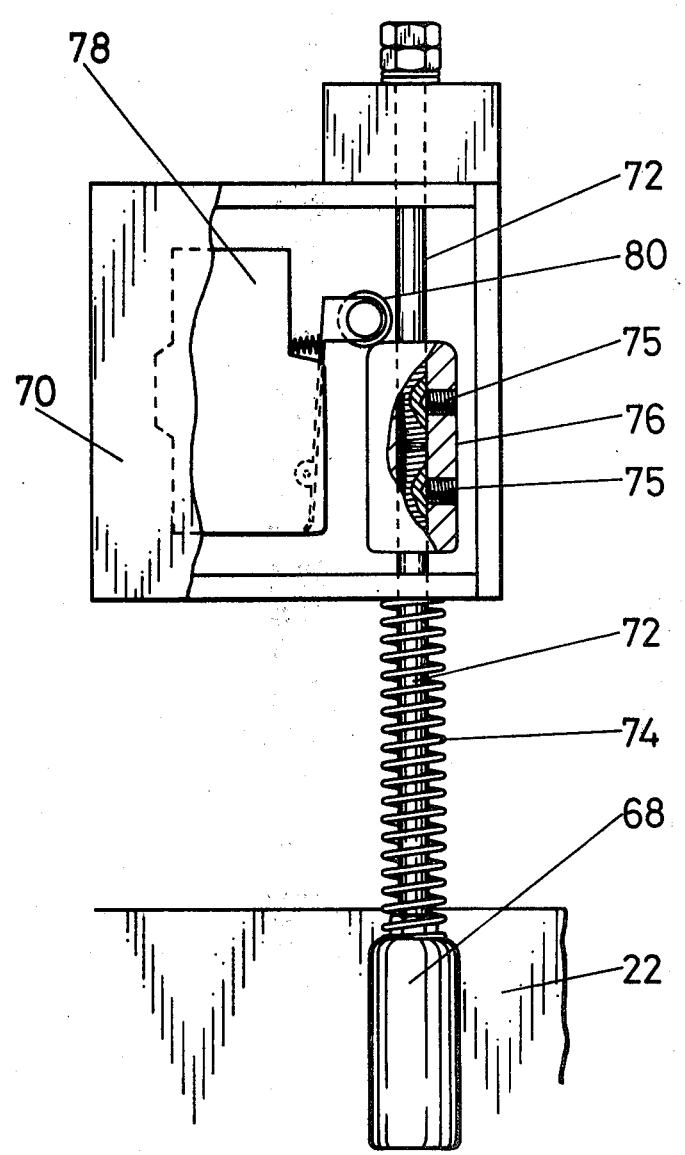
FIG. 4 is a partial enlarged-scale partially cutaway front view showing part of an auxiliary guard plate control mechanism of the safety device shown in FIG. 1.

Two cylindrical members 68 are secured to the auxiliary guard plate 22 adjacent to the opposite ends of the front side, and switch boxes 70 are secured to the guard plate 10 above these cylindrical members 68. As shown in FIG. 4, two operating rods 72 are provided one above the other within each switch box 70 and with the upper and lower ends of the respective operating rods 72 being in contact with each other within a dog 76. A set screw 75 with a hexagon recess is mounted such that it engages the corresponding side of each operating rod 72 to prevent the rod from being spontaneously moved. Two of the operating rods 72 are respectively secured to each cylindrical member 68 which is mounted on the auxiliary guard plate 22. A spring 74 is fitted on a portion of the operating rod 72 between the lower end of the switch box 70 and the upper end of the cylindrical member 68 so that the auxiliary guard plate 22 is spring biased downward. The dog 76 is mounted on the operating rods 72 within the switch box 70. A switch 78 is provided on one side of the operating rod 72 within the switch box 70, and an actuator 80 is mounted on part of the switch 78 adjacent the dog 76. The actuation of switch 78 is controlled by the dog 76 being brought into contact with and separated from the actuator 80 with the vertical movement of the operating rod 72. The dog 76 is usually not in contact with the actuator 80 but is separated therefrom.

When the auxiliary guard plate 22 is raised against the spring action of the springs 74, the operating rods 72 are raised into contact with the actuators 80 provided adjacent the switches 78, whereby the press 76 is stopped while the guard plate 10 and auxiliary guard plate 22 are raised altogether through electric control.

The switches 78 within the switch boxes 70 on the opposite sides are connected together by an electric cord 71, as shown in FIGS. 1 with a central portion of the cord 71 led out through opposite side holes formed in the guard plate 10 to the front side thereof. The opposite end portions of the cord 71 led to the back side of the guard plate 10, and the opposite ends of the cord 71 connected to cords 82 led from the switch boxes 70 to the outside. The cord 82 which is led out from one of the switch boxes 70 is provided at its free end with a plug 81, which is connected to a plug receptacle provided on a lower portion of the corresponding upright portion 24. Since the guard plate 10 is raised with the electric cord 82 connected to the receptable 83, the length of the cord should be in excess of the maximum distance of movement of the guard plate 10.

Figure 3:
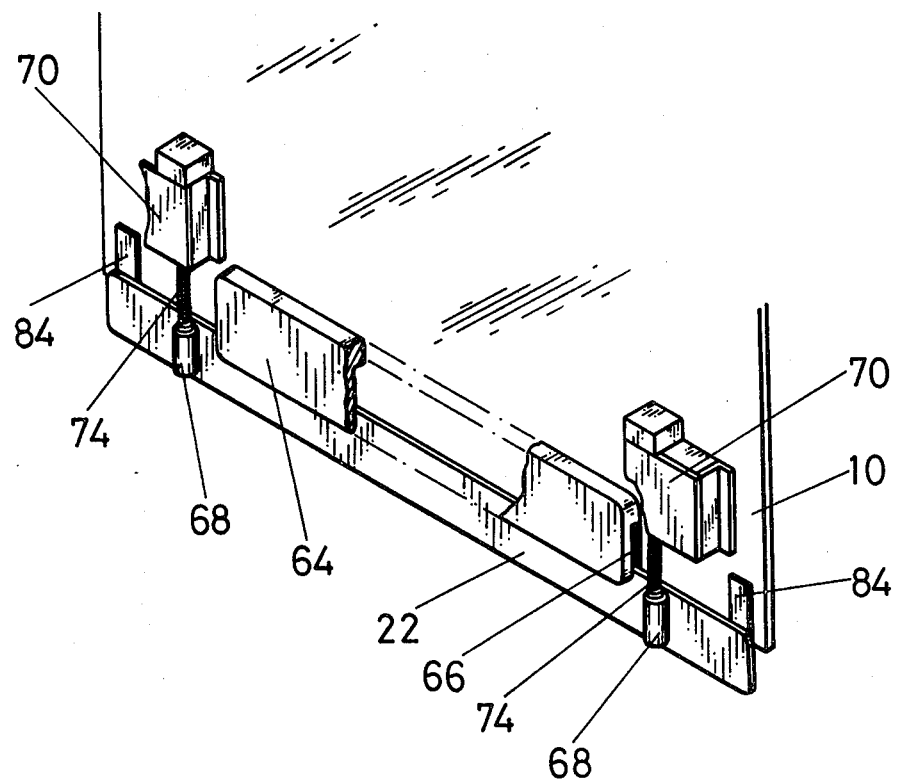
FIG. 3 is a partial perspective view showing a lower portion of the guard plate of the safety device shown in FIG. 1.

As shown in FIGS. 1 and 3, guide members 84 are shown to project upright from the opposite ends of the auxiliary guard plate 22 for ensuring reliable vertical movement of the auxiliary guard plate 22.

According to the invention, an air cylinder 16 is mounted on the back side of one of the upright portions 24 of the frame 12 for causing vertical movement of the guard plate 10 as mentioned earlier. In further detail, the air cylinder 16 is provided at its upper and lower end portions with brackets 86 which are attached to the upright portion 24, as shown in FIG. 2. The upper and lower sides of the air cylinder 16 are connected to each other by an air pipe 90, and an air intake pipe 92 is led to the front side. A vertically movable rod 42 projects from the air cylinder 16, and the coupling member 44 is secured to the upper end of the rod 42, and as previously member 44 is coupled to the movable arm 14 by the pin 48 inserted through the slot 46 formed near the right hand end of the movable arm 14.

As shown in FIG. 5, the pin 48, on the side of the upright portion 24 of the frame 12, is provided with a projection 94, which is received in a guide groove 98 of a guide member 96 mounted on the upright portion 24. The projection 94 is vertically moved within the guide groove 98, with the vertical movement of the rod 42, for ensuring reliable swinging of the arm 14 without any undesired motion.

As shown in FIGS. 2 and 5, the end of the movable arm 14 on the side of the upright portion 24 is provided with an actuating piece 100 in the form of a small rectangular plate. This actuating piece 100 is adapted such that when the aforementioned movable arm end is raised with the upward movement of the rod 42 to the uppermost position by the air cylinder 16, the piece 100 is brought into contact with an actuator 102 connected to a switch 18 which is mounted on the back side of an upper portion of the upright portion 24. In other words, with the ascent of the rod 42 of the air cylinder 16, the movable arm 14 is caused to swing about the bolt 52 whereby the free end of the movable arm 14 is lowered together with the guard plate 10 while the other end of the movable arm 14 is raised.

Thus, when the guard plate 10 is lowered toward the horizontal portion 30 the frame 12, the actuating piece 100 at the end of the movable frame 14 is brought into contact with the actuator 102 of the switch 18 provided on an upper portion of the upright portion 24, and by the operation of this actuator 102 the operation of the press 26 is started.

A balancer mechanism 20 is coupled to the movable arm 14 in order that the guard plate 10 can be raised and lowered at a constant speed and with an averaged load, and it will now be described in detail. The upright portion 24, on which the air cylinder 16 is provided, is also provided on the outer side thereof with a vertical support shaft 104 extending parallel with the upright portion 24. The support rod 104 is secured at its lower end to a bracket 106 which is secured to the frame 12, and its upper and lower ends are provided with respective spring retainers 108. Five pieces 110 are provided on the outer periphery of rod 104 and each piece 110 is provided with a helical groove. The pieces 110 are uniformly spaced with respect to the support rod 104 between the upper and lower retainers 108. A spring 112 is fitted around the support rod 104 and is received in the helical groove formed in each piece 110 and secured thereto.

Between the spring 112 and air cylinder 16, a shaft 114 vertically extends with its upper end secured to the coupling member 44 which is coupled to the end of the movable arm 14 so that the shaft 114 is vertically moved with the vertical movement of the movable arm 14. A coupling member 116 is secured by nuts 118 to an intermediate portion of the shaft 114, and the member 116 is also secured to the central piece 110 in the balancer mechanism 20. Thus the balancer mechanism 20 and movable frame 14 are coupled together via the rod 114 and the coupling member 116 so that the action of the balancer mechanism 20 is always conveyed through the movable arm 14 to the guard plate 10.

The spring 112 of the balancer mechanism 20 is not in the free state over its entire length but is secured to the pieces 110 provided between the upper and lower retainers 108.

Thus, with the vertical movement of the rod 114 the portions of the spring 112 provided on upper and lower sides of the coupling member 116 are respectively elongated and compressed or vice versa so that the ascent and descent of the movable arm 14 are caused by an average force.

Consequently, the guard plate 10 is raised and lowered by the movable arm 14 with the operation of the air cylinder 16 but is not excessively raised or excessively lowered such that it can strike the horizontal portion 30 of the frame 12 and causes damage thereto.

As shown in FIG. 1, the upright portions 24 of the frame 12 are each provided on their respective front side of a central portion thereof with a grip 120 which is used during the installation and removal of the safety device of the present invention into and out of the press 26. In order to install this device on the head 28 of the press 26 the horizontal portion 30 of the frame 12 is provided with threaded holes 124 for inserting therethrough screws.

Figure 6:
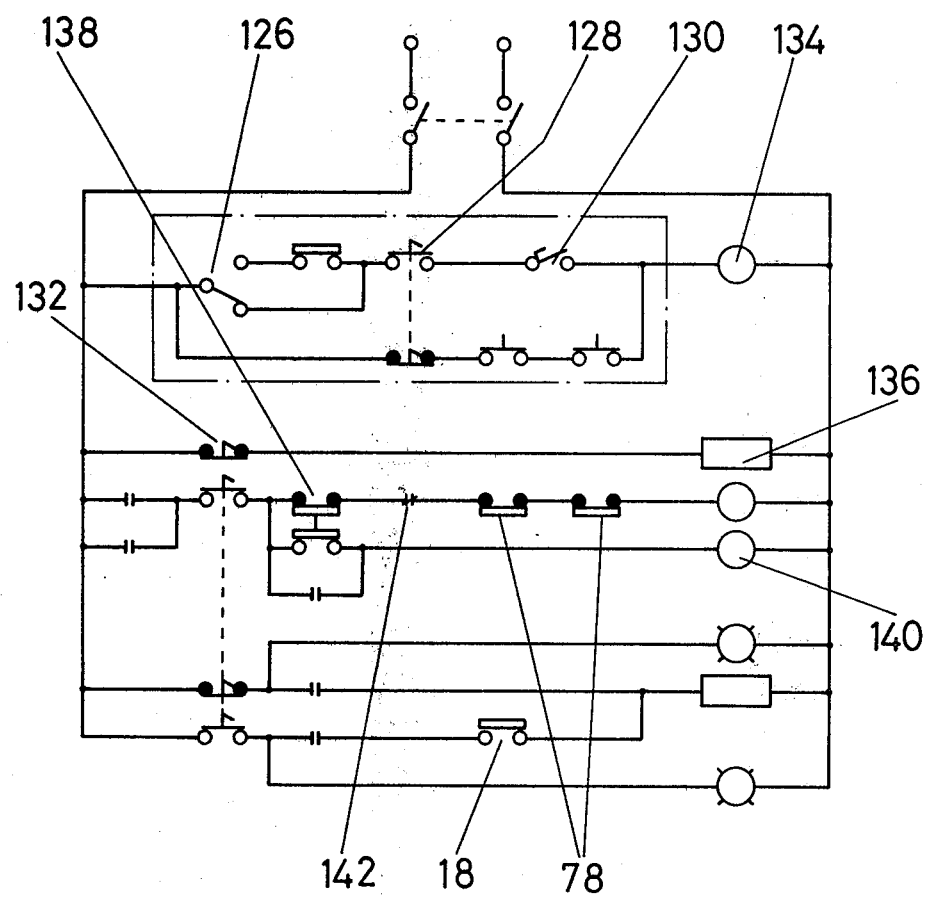
FIG. 6 is a wiring diagram of the device shown in FIG. 1.

Now, the operation of this device of the present invention will be explained in connection with the operation of the press with reference to FIGS. 1, 6 and 7.

A snap switch 126, a select switch 128 and a select switch 132 provided on the side of the press are respectively set to the process side, to the side of a foot switch and to the manual side.

When a foot switch 130 is depressed, current is caused to flow through a magnet relay 134 of this device to close its switch so as to operate a solenoid valve 136 of a solenoid valve mechanism 88, whereby the rod 42 of the air cylinder 16 starts to rise which lowers the guard plate 10 by the movable arm 14. When the guard plate 10 is completely lowered to the horizontal portion 30, the actuating piece 100, provided at the end of the movable arm 14 which has been raised, comes into contact with the actuator 102 of the switch 18 to render the switch 18 operative, whereby the press 26 is operated. When the operation of the press 26 is completely after the descent of the ram thereof, the limit switch is operated to render a magnet relay 140 operative so as to open a switch 142 for cutting off current in the coil of a solenoid controlled valve 136, whereby the valve 136 is actuated. As a result, the rod 42 of the air cylinder 16 starts to lower which causes the guard plate 10 to be raised by the movable arm 14. At the same time, the actuating piece 100 at the end of the movable arm 14 is separated from the actuator 102 of the switch 18, so that the operation of the press 26 is stopped.

With slight ascent of the auxiliary guard plate 22 the switch 78, within the switch box 70 mounted on the auxiliary guard plate 22, is opened which causes the solenoid controlled valve 136 to be actuated, thus causing the descent of the rod 42 of the air cylinder 16 which causes a swinging of the movable arm 14 which raises the guard plate 10.

It is obvious that various changes and modifications can be made without departing from the scope and spirit of the invention, and the aforementioned embodiment is by no means limitative, rather the limitations of the invention are defined by the accompanying claims.

What is claimed is:

1. A safety device for a machine, said device comprising:
    a frame, a first guard plate mounted in said frame for vertical movement with respect to said frame;
    a movable arm connected to said first guard plate for imparting vertical movement thereto;
    a movable rod connected to said movable arm for imparting movement thereto;
    motive means for imparting a movement to said movable rod;
    a first switch means connected to the machine for actuating said machine;
    a first switch actuation means operatively associated with said first switch means for actuating said first switch means when said movable rod moves; and
    a second guard plate movably attached to said first guard plate and having a second switch means operatively associated with said first guard plate for deactuating said motive means when said second guard plate moves relative to said first guard plate.

2. A safety device as claimed in claim 1, wherein said first guard plate is made of a transparent plastic.

3. A safety device as claimed in claim 1, wherein said motive means includes an air cylinder which slidably receives a portion of said movable rod.

4. A safety device as claimed in claim 1 wherein said second switch means includes:
    a switch case attached to said first guard plate and having a hole therein being dimensioned to slidably receive an operating rod;
    an operating rod having one end attached to said second guide plate and the other end slidably extended into said switch case through said hole;
    a second switch actuation means positional inside said switch case and operatively associated with said second switch means for actuating said second switch means when said second guard plate moves toward said first guard plate thereby causing said operating rod to move into said casing.

5. A safety device as claimed in claim 1, wherein said second guard plate includes a biasing means for biasing said second guard plate away from said first guard plate.

6. A safety device as claimed in claim 1, further comprising a balancer mechanism connected to said movable rod, said balancer mechanism including:
   a support rod attached to said frame at the ends of said support rod;
   a coil spring positioned around the periphery of said support rod;
   spring retainers connected to said support rod and abutting the ends of said coil spring for maintaining said coil spring in position around said support rod; and
   a shaft having one end connected to said movable rod and the other end connected to a middle portion of said coil spring, whereby when said movable rod moves a portion of said coil spring is compressed and another portion of said coil spring is expanded thereby exerting a resulting biasing force on said movable rod.

7. A safety device as claimed in claim 6, wherein said support rod is substantially parallel to said movable rod.

8. A safety device as claimed in claim 6, wherein said balancer mechanism further includes several cylindrical spacers, each of said spacers having a helical groove around its outer periphery which is spiraled and dimensioned such that a portion of said coil spring can snugly fit therearound and extend into said groove, and said spacers being slidably positioned around said support rod and being snugly fitted to the inside periphery of a portion of said coil spring.

9. A safety device as claimed in claim 8, wherein said spacers are equally spaced from one another along the longitudinal axis of said support rod.

* * * * *